Jan. 9, 1968   H. RUBE   3,362,772
SELF-THREADING MOTION PICTURE PROJECTOR
Filed Aug. 3, 1965   3 Sheets-Sheet 1

INVENTOR:

HELMUT RUBE

BY

Michael S. Striker
his ATTORNEY

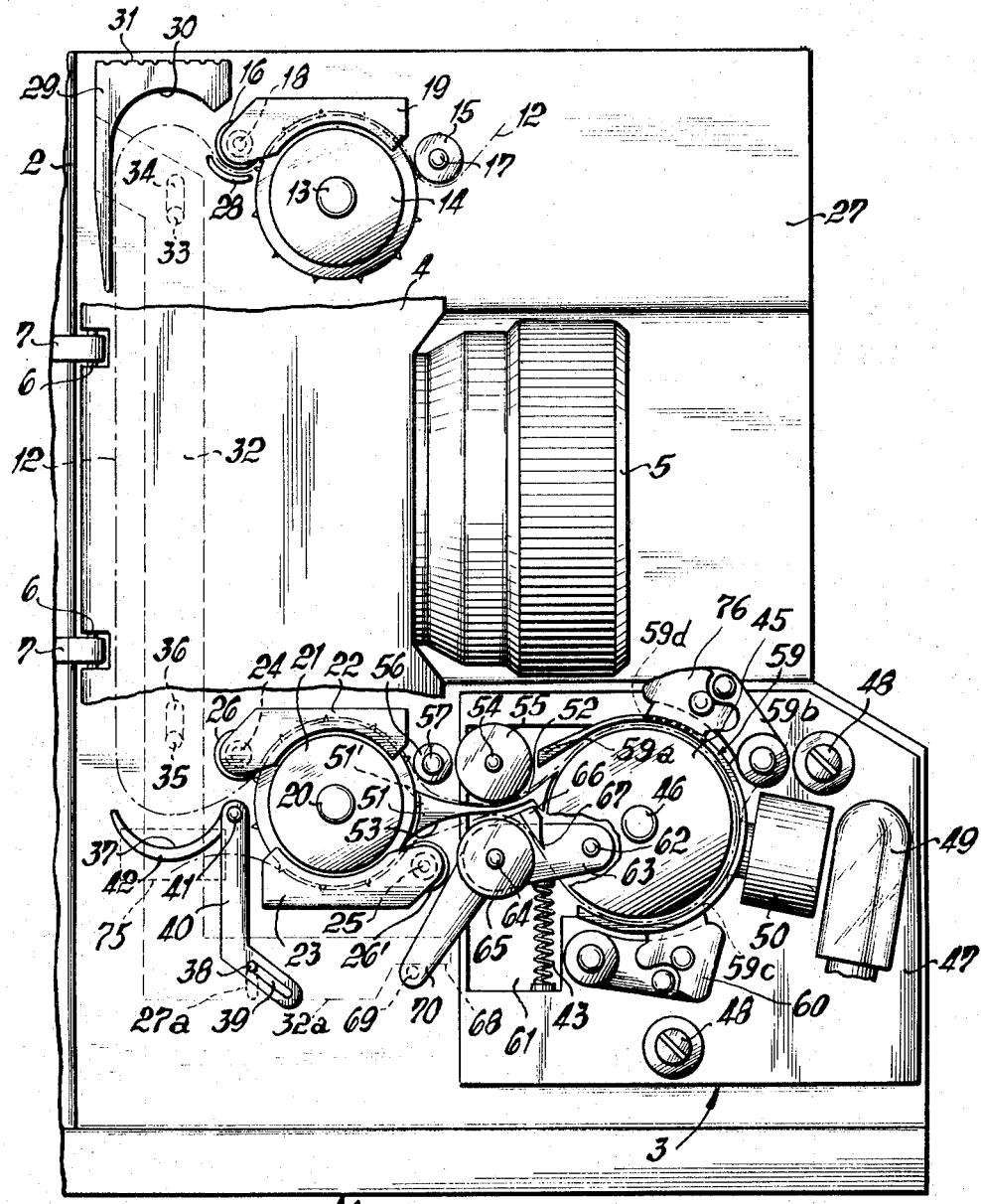

3,362,772
SELF-THREADING MOTION PICTURE PROJECTOR
Helmut Rube, Endersbach, Germany, assignor to Eugen Bauer G.m.b.H., Stuttgart-Unterturkheim, Germany
Filed Aug. 3, 1965, Ser. No. 476,945
Claims priority, application Germany, Aug. 22, 1964, B 78,230
20 Claims. (Cl. 352—29)

The present invention relates to self-threading motion picture projectors in general, and more particularly to an improved automatic threading sound projector. Still more particularly, the invention relates to a self-threading device for sound projectors of the type wherein, after passing the film gate, the film is led from a feed sprocket around a sound drum and back into engagement with the feed sprocket.

It is an important object of the present invention to provide a very simple and highly reliable self-threading device for use in sound projectors and to construct and assemble the self-threading device in such a way that it comprises a minimal number of movable parts.

Another object of the invention is to provide a sound projector which embodies the above outlined self-threading device and to further provide the sound projector with automatic film looping devices which are arranged to form loops in automatic response to setting of the threading device for automatic advance of the leading end of a film from the supply reel to the take-up reel.

A further robject of the invention is to provide a self-threading device which is constructed and assembled in such a way that it automatically tensions the film around the sound drum of the sound portion when the projector is ready for operation.

An additional object of the invention is to provide a self-threading device which is automatically placed in condition in which it is ready to permit for projection of images and for reproduction of sound when the leading end of the film has advanced through the image projecting and sound portions of the projector and wherein such automatic adjustment of the self-threading device is initiated by the film so that it requires no manipulation by the hand of the operator.

A concomitant object of the invention is to provide a self-threading device of the above outlined characteristics which includes a film tensioning member and wherein the tensioning member automatically assumes its operative or tensioning position when the leading end of the film has advanced through and beyond the image projecting and sound reproducing portions of the projector.

Another object of the invention is to provide a self-threading device wherein several closely adjacent components may be assembled into a compact unit and wherein such unit is readily connectable to or detachable from the remainder of the projector.

A further object of the invention is to provide a self-threading device which occupies little room, whose operation is more reliable than the operation of conventional self-threading devices of which I am aware at this time, and which is not likely to scratch or otherwise damage the film during threading or during reproduction of images or sound.

Still another object of the invention is to provide a self-threading device which can be adjusted or regulated with little loss in time, wherein the leading end of the film is invariably guided in an accurately determined path even if the film is somewhat creased, crimped, or otherwise damaged or deformed, and which can be manipulated by semiskilled as well as by unskilled persons without the risk of damaging or destroying the mechanism.

A further object of the invention is to provide a self-threading device of the above outlined characteristics which, in its elementary form, comprises only a single movable film guide so that proper adjustment of such single movable part requires a minimum of time and skill.

Another object of the invention is to provied a self-threading device which is constructed and assembled in such a way that each of the consecutively introduced films is guided in exactly the same accurately defined path to insure highly satisfactory reproduction of images and sound and to further insure exceptionally gentle treatment of film.

Briefly stated, one feature of the present invention resides in the provision of an automatic threading sound projector comprising a film gate, first and second film looping means respectively located ahead of (i.e., upstream) and past (i.e., downstream of) the film gate, a feed sprocket located downstream of the second film looping means, a sound drum adjacent to but spaced from the sprocket, a first fixed film guide disposed between the sprocket and the sound drum and having two concave guide faces one of which guides the film from one side of the sprocket toward the periphery of the sound drum and the other of which guides the film from the periphery of the sound drum to the other side of the sprocket, a second fixed film guide surrounding a first peripheral portion of the sound drum and having a front portion overlying the one guide face of the first film guide for guiding the film around the first peripheral portion of the sound drum, a tensioning roll which is adjacent to the other guide face of the first film guide and is movable to and from a film tensioning position, a third film guide located between the tensioning roll and a non-surrounded second peripheral portion of the sound drum, a stripping portion or edge provided on the third film guide and movable therewith toward and away from the second peripheral portion of the sound drum, actuating means for moving the third film guide to a first position in which the stripping portion is nearer to the sound drum and the third guide directs the film from the first peripheral portion of the sound drum toward the other guide face of the first film guide, and resilient means for biasing the third film guide to a second position in which the stripping portion is more distant from the sound drum and for simultaneously biasing the tensioning roll to tensioning position in which the film is tensioned around and hugs the first peripheral portion of the sound drum.

Each of the film looping means comprises an element which is movable to and from a loop forming position, and the actuating means may comprise a pushbutton which is depressible by hand to move the tensioning roll away from tensioning position, to move the third film guide to the first position, and to move the elements of the looping means to loop forming positions against the bias of the resilient means.

The novel features which are considered as characteristic of the invention are set forth in particular in the appended claims. The improved movie projector itself, however, both as to its construction and its mode of operation, together with additional features and advantages thereof, will be best understood upon perusal of the following detailed description of a specific embodiment with reference to the accompanying drawings, in which:

FIG. 3 is a similar enlarged side elevational view and illustrates the parts of the film threading device in positions they assume when the projector is in actual use.

Figure 1:
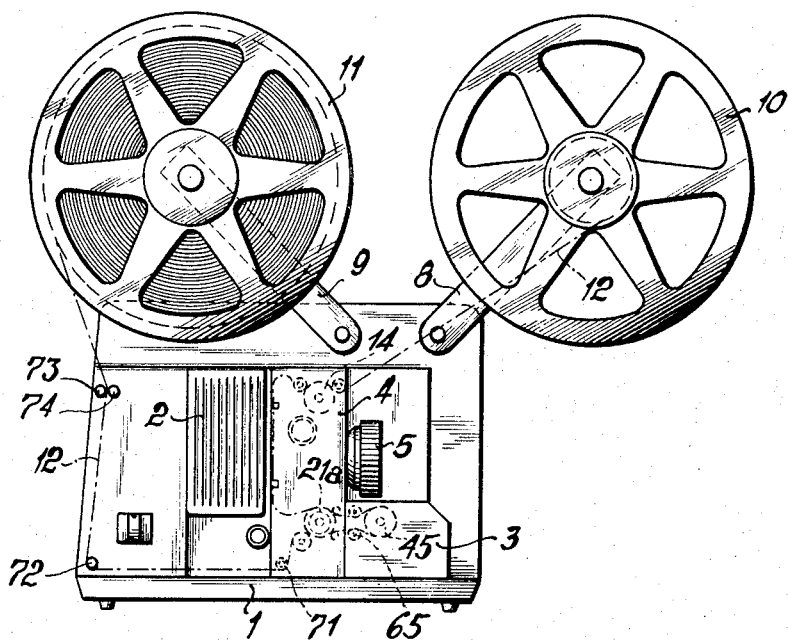
FIG. 1 is a diagrammatic side elevational view of a sound projector which embodies my invention.

Referring to the drawings, and first to FIG. 1, there is shown a sound projector which comprises a housing 1 supporting a lamp accommodating portion or cabinet 2 and a sound portion 3. A film gate 4 is hingedly supported by the housing 1 in front of the lamp cabinet 2 and carries a projection lens 5. This gate 4 comprises a vertical pintle 6 which is rotatably supported in eyes 7 (see FIG. 2 or 3) provided on the lamp cabinet 2. The pintle 6 is parallel with that portion of the film 12 which extends along the film gate 4.

The upper portion of the housing 1 supports two folding reel arms 8 and 9 which respectively support a film supply reel or spool 10 and a take-up reel or spool 11. In forward operation, the film 12 is drawn off the supply reel 10 and is taken up by the reel 11 after passing through the image projecting and sound reproducing portions of the projector.

Located at a level above the projection lens 5 is a fixed shaft 13 for an upper film transporting member here shown as a feed sprocket 14 which is driven by the motor of the projector in a manner well known from the art and therefore not shown in the drawings. The teeth of the sprocket 14 enter the perforations of the film 12 and advance the latter in a direction to the left, as viewed in FIG. 2 or 3. The film 12 is trained around two guide rollers 15, 16 which are respectively mounted upstream and downstream of the sprocket 14 and rotate on fixed shafts 17, 18. A spring-biased sprocket guide 19 overlies the upper peripheral portion of the sprocket 14 and is rockable on the shaft 18 of the guide roller 16. The non-illustrated spring biases this sprocket guide 19 in a clockwise direction, as viewed in FIG. 2 or 3, so that the concave underside of the sprocket guide maintains the film 12 in close proximity to the upper peripheral portion of the sprocket 14. The sprocket guide 19 is located between the guide rollers 15 and 16. The underside of the sprocket guide 19 has a curvature which is complementary to the curvature of the sprocket 14.

Located at a level below the projection lens 5 is a second or lower film transporting member in the form of a feed sprocket 21 which is mounted on a fixed horizontal shaft 20. The teeth at the upper side of this lower sprocket 21 also enter the perforations of the film 12 to advance the film in a direction to the right, as viewed in FIG. 2 or 3, and toward a sound drum 45 which forms part of the sound portion 3 and is mounted on a horizontal shaft 46 which is parallel with the shaft 20. It will be noted that the sound drum 45 is adjacent but still spaced from the lower feed sprocket 21. The lower sprocket 21 cooperates with an upper spring-biased sprocket guide 22 which is rockable about the shaft 24 of a guide roller 26 and with a lower spring-biased sprocket guide 23 which is rockable on the shaft 25 of a guide roller 26′. The configuration and mounting of each of the sprocket guides 22, 23 is analogous to that of the sprocket guide 19. The springs which bias the concave faces of the sprocket guides 22, 23 toward the upper and lower peripheral portions of the lower feed sprocket 21 are not shown in the drawings.

The parts 13 to 26′ are mounted on a main support or frame plate 27 which forms part of or is attached to the housing 1. The frame plate 27 comprises an integral projecting portion 28 which is of arcuate shape and is located directly below the guide roller 16 on the shaft 18. The projecting portion 28 constitutes a fixed element or inner guide of an upper film looping device which further includes a movable element in the form of an arcuate outer guide 29 which is movable from the loop forming position of FIG. 2 to the idle or retracted position of FIG. 3 or vice versa. The guide face 30 at the underside of the outer guide 29 is of concave shape and resembles a portion of a cylindrical surface. The upper part of the outer guide 29 is rigidly connected to or is integral with an actuating member here shown as a push-button 31 which may be depressed by hand to move from the position of FIG. 3 to the position of FIG. 2. The pushbutton 31 is exposed so that it may be reached by a finger without necessitating opening or partial dismantling of the projector.

The outer guide 29 is connected with a downwardly extending motion transmitting rail 32 which is adjacent to the inner side of the frame plate 27 and is provided with aligned vertical slots 34, 36 for a pair of guide pins 33, 35 which are rigid with the frame plate 27. Thus, the rail 32 is reciprocable up and down to the extent determined by the length of its slots 34, 36. The lower end portion of the rail 32 carries a horizontal arm 32a which extends in a direction to the right, as viewed in FIG. 2 or 3, and carries a pin 38 which extends through a slot 27a of the frame plate 27 into an inclined slot 39 provided in the lower end portion of a lower film looping device 40. This lower looping device is rockable on a horizontal shaft 41 which is carried by the frame plate 27 and is rotated by the pin 38 to turn in a counterclockwise direction, as viewed in FIG. 2 or 3, when the pushbutton 31 is depressed and assumes the postion shown in FIG. 2. The lower film looping device 40 comprises a sickle-shaped loop forming element 42 having a concave upper guide face 37 which moves upwardly and nearer to the lower pin 35 of the frame plate 27 when the pushbutton 31 is depressed and assumes the position of FIG. 2. A resilient element 43, here shown as a helical expansion spring, is mounted on the housing 1 and serves to indirectly bias the pushbutton 31 upwardly and to the idle position of FIG. 3. The manner in which the bias of the spring 43 is transmitted to the rail 32 and pushbutton 31 will be described in full detail hereinafter. When the spring 43 is free to expand, the movable elements 29, 42 of the two film looping devices are moved away from their loop forming positions and assume their respective idle or retracted positions which are shown in FIG. 3. In such retracted positions of the elements 29 and 42, the concave guide faces 30 and 37 are out of actual contact with the film 12.

The shaft 46 of the sound drum 45 is mounted on a plate-like carrier 47 which is fixed to the frame plate 27 by screws 48. The sound drum 45 is rotatable on its shaft 46. The carrier 47 supports additional components of the sound portion 3 including a sound lamp 49 of known construction which serves to illuminate a sound track on that portion of the film 12 which is trained around the right-hand peripheral portion of the sound drum 45. A lens assembly 50 which includes a condenser lens focuses the light beam issuing from the sound lamp 49 onto a narrow portion of the moving sound track. That edge portion of the film 12 which carries the sound track extends beyond the adjoining axial end of the sound drum 45.

The sound lamp 49 and the lens assembly 50 are located at one side of that portion of the film 12 which is trained around the sound drum 45. The other side of such film portion is adjacent to a photoelectric cell (not shown) which is connected in circuit with one or more amplifiers in a manner well known from the art of conventional sound projectors. The amplifier or amplifiers and the photoelectric cell constitute additional components of the sound portion 3.

In order to facilitate automatic threading of the film 12, the projector of the present invention further comprises a fixed film guide 51 which is located between the lower feed sprocket 21 and the sound drum 45. This fixed guide 51 is provided with a concave upper guide face 52 and with a concave lower guide face 53. Adjacent to the upper guide face 52, there is located a guide roller 55 which is rotatable on a fixed horizontal shaft 54 and a guide roller 56 which is rotatable on a fixed horizontal shaft 57. The left-hand portion of the fixed guide 51 carries or is integral with a stripping finger or tongue 51' whose tip extends into a circumferential groove 21a provided on the lower feed sprocket 21. The function of the finger 51' is to direct the film travelling between the upper side of the sprocket 21 and the upper sprocket guide 22 away from the periphery of the sprocket 21 and toward the upper guide face 52 of the fixed guide 51. The circumferential groove 21a of the lower feed sprocket 21 is indicated in FIG. 1 by a broken-line circle.

The fixed guide 51 cooperates with a second fixed guide 59 which is of arcuate shape and surrounds with some clearance the right-hand peripheral portion of the sound drum 45. The front portion 59a of the guide 59 overlies but is spaced from the right-hand end portion of the upper guide face 52 to make sure that the film 12 advancing along the guide face 52 is compelled to enter the arcuate gap along the concave inner surface of the fixed guide 59. The latter is provided with a series of cutouts or windows 59b, 59c and 59d which accommodate portions of various components forming part of the sound portion 3. The window 59b accommodates a portion of the lens assembly 50, the window 59c accommodates a portion of a magnetic sound recording and reproducing head 60 of known design, and the third window 59d accommodates a portion of a magnetic sound erasing head 76.

In the illustrated embodiment, the two fixed film guides 51 and 59 constitute integral projections of a fixed plastic holder 61 which is attached to the carrier 47 and which also supports the shaft 54 of the guide roller 55 at a level above the upper guide face 52. The sound drum 45 is located in front of and normally conceals a further shaft 62 (see FIG. 3 wherein a portion of the sound drum 45 is broken away) which mounts a rockable support in the form of a lever 63. The lever 63 is provivded with a shaft 64 for a film tensioning member here shown as a roll 65 movable by the lever 63 into and away from tensioning engagement with that portion of the film 12 which is adjacent to the lower guide face 53 of the fixed guide 51, compare FIGS. 2 and 3. When the roll 65 assumes the tensioning position of FIG. 3, it tensions that portion of the film 12 which extends around the right-hand peripheral portion of the sound drum 45. The lever 63 is biased by the spring 43 which tends to rock it in a clockwise direction, as viewed in FIG. 2 or 3, so that the tensioning roll 65 moves to a higher level whenever the lever 63 is free to follow the bias of the spring 43. The arrangement is such that the roll 65 engages and tensions the film 12 when the loop forming elements 29 and 42 are moved away from the film (see FIG. 3).

Figure 4:
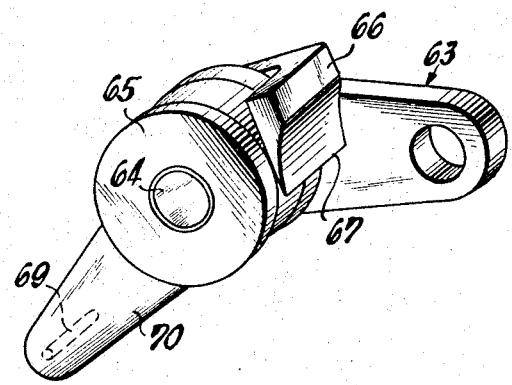
FIG. 4 is an enlarged perspective view of a movable film guide which forms part of the film threading device shown in FIGS. 2 and 3.
Figure 2:
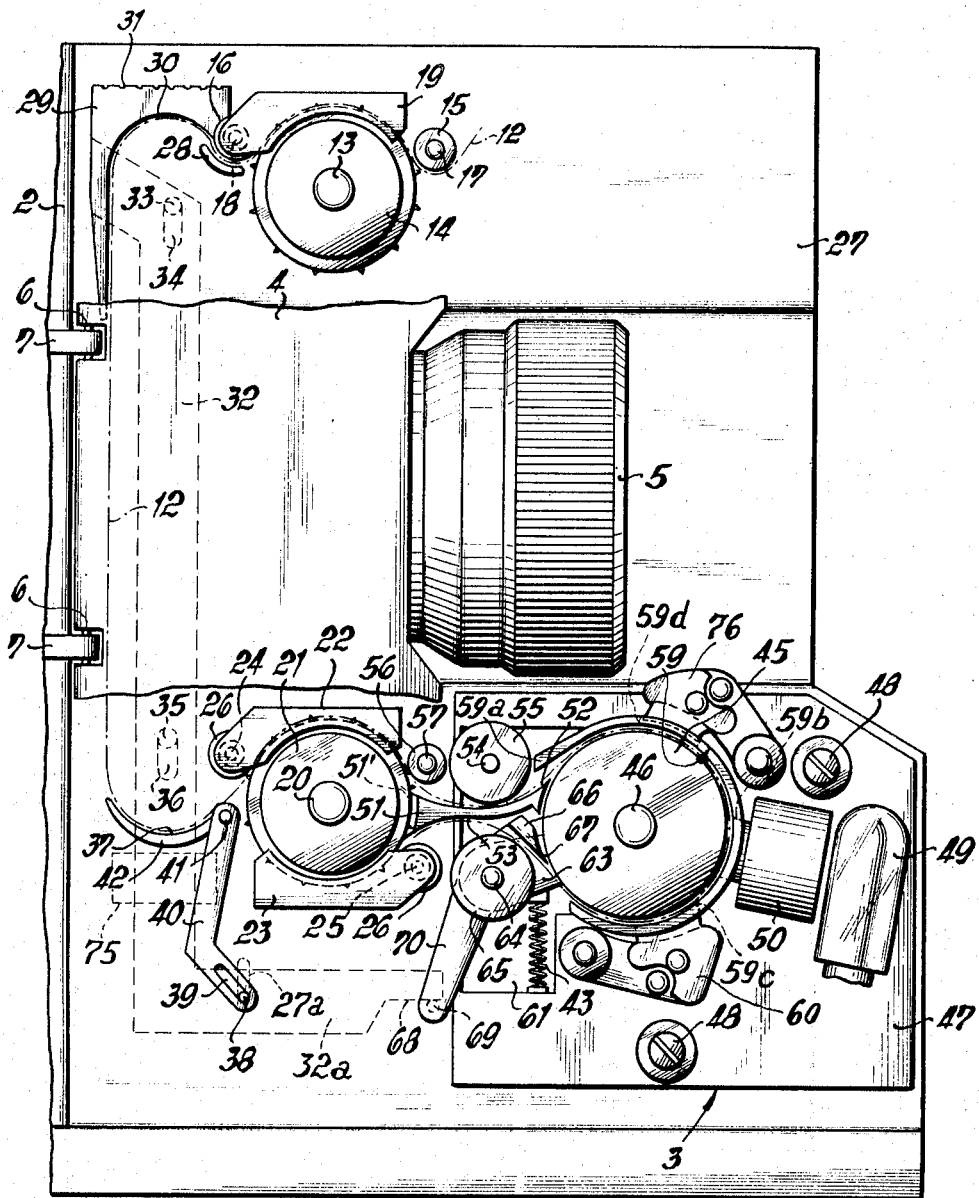
FIG. 2 is an enlarged side elevational view of a detail of the projector shown in FIG. 1, the parts of the automatic film threading device being illustrated in positions ready to automatically advance the leading end of the film toward the take-up reel of the projector.

The lever 63 further carries a movable film guide 66, best shown in FIG. 4, which is provided with a stripping portion 67 resembling a knife edge and extending in the axial direction of the sound drum 45. This film guide 66 is located between the tensioning roll 65 and the non-surrounded left-hand peripheral portion of the sound drum 45. The purpose of the film guide 66 is to facilitate automatic threading of the film 12 by moving its stripping portion or edge 67 nearer to the periphery of the sound drum 45 when the pushbutton 31 is depressed and assumes the position shown in FIG. 2. The stripping portion 67 then directs the film away from the periphery of the sound drum 45 and toward the lower guide face 53 of the fixed guide 51. When the spring 43 is free to expand, the stripping portion 67 moves away from the sound drum 45, see FIG. 3. In the position of FIG. 2, the stripping portion 67 can come into actual abutment with the periphery of the sound drum 45.

The means for rocking the lever 63 and the parts 65, 66 thereon against the bias of the spring 43 comprises a follower 69 provided on a downwardly extending arm 70 of the lever 63 and a cam 68 provided at the right-hand end of the arm 32a on the rail 32. Thus, when the rail 32 is caused to move downwardly, the follower 69 compels the lever 63 to rotate in a counterclockwise direction, as viewed in FIG. 3, and to move to the position of FIG. 2 in which the spring 43 stores energy and the stripping portion 67 of the movable guide 66 engages the periphery of the sound drum 45 to strip the film 12 off this drum and to direct it toward the gap between the tensioning roll 65 and the lower guide face 53 of the fixed guide 51. The stripping portion 67 then constitutes a brake for the sound drum 45.

My improved sound projector is operated as follows:

When the leading end of the film 12 is to be placed around the first guide roller 15 and into the space between the upper feed sprocket 14 and the sprocket guide 19, the parts of the projector assume the positions shown in FIG. 3, i.e., the spring 43 is free to expand and the pushbutton 31 is released so that the loop forming elements 29 and 42 are retracted. In the first step, the operator depresses the pushbutton 31 to move the elements 29 and 42 to the positions shown in FIG. 2. The cam 68 rocks the lever 63 in a counterclockwise direction, as viewed in FIG. 3 and the lever 63 compresses the spring 43. The self-threading device of the projector is now ready to allow for automatic threading of the film 12. The projector further comprises a conventional blocking device 75 which automatically retains the rail 32 in the position of FIG. 2 during the initial stage of the automatic threading operation. The blocking device 75 opposes the expansion of the spring 43 until after the leading end of the film 12 has advanced beyond the lower side of the lower feed sprocket 21. It is clear that the blocking device 75 may engage another component of the motion transmitting connection 29, 32, 32a, 68, 69, 70, 63 between the pushbutton 31 and the movable film guide 66 and tensioning roll 65.

In the next step, the operator starts the motor which drives the feed sprockets 14 and 21 in opposite directions (i.e., the upper feed sprocket 14 rotates in a counterclockwise direction and the lower feed sprocket 21 rotates in a clockwise direction, as viewed in FIG. 2) and inserts the leading end of the film 12 coming from the supply reel 10 between the guide roller 15 and feed sprocket 14. The teeth of the sprocket 14 enter the perforations of the film 12 and the latter begins to advance along the concave underside of the sprocket guide 19, in the gap between the guide roller 16 and inner guide 28, along the concave underside 30 of the outer guide 29 which causes the film to form a loop upstream of the film gate 4, through the gate 4, along the concave upper side of the guide 42 which causes the film to form a second loop downstream of the gate 4, along the underside of the guide roller 26, along the underside of the spring-biased sprocket guide 22 whereby the film is engaged by the teeth at the upper side of the lower feed sprocket 21, along the guide rollers 56, 55 and along the upper face 52 of the fixed guide 51, along the front portion 59a of the fixed guide 59 and around the right-hand peripheral portion of the sound drum 45, along the stripping portion 67 and the movable guide 66, above the tensioning roll 65 and along the lower face 53 of the fixed guide 51, above the guide roller 26', along the concave face of the spring biased sprocket guide 23 whereby the film is engaged by the teeth at the lower side of the sprocket 21, and on toward the take-up reel 11 on the arm 9. The stripping finger 51' of the fixed guide 51 insures that the film is separated from the teeth at the upper side of the sprocket 21 and advances below the guide rollers 56, 55 and along the upper guide face 52 of the fixed guide 51. The path for the film 12 between the lower sprocket guide 23 and the take-up reel 11 on the arm 9 is defined by additional guide members 71, 72, 73, 74 (see FIG. 1) whose construction or mounting forms no part of the present invention. During movement along this path, the film disengages the aforementioned blocking device 75 from the rail 32 so that the spring 43 is free to expand and returns the parts 31, 29, 32, 40, 42, 69, 63, 65 and 66 to the positions shown in FIG. 3. Thus, the guide faces 30 and 37 are now spaced from the loops of the film 12 and the tensioning roll 65 moves to tensioning position in which it maintains a length of the film in tight engagement with the right-hand peripheral portion of the sound drum 45 whereby the drum rotates in response to lengthwise movement of the film. The movable guide 66 is shifted away from the sound drum 45 so that the latter is released by the stripping portion 67 and is free to rotate in response to frictional engagement with the travelling film.

It was found that the self-threading device shown in FIGS. 2 and 3 insures highly satisfactory and exceptionally accurate control of movement of the film through the image projecting and sound reproducing portions of the improved movie projector. As a rule, the self-threading device is constructed in such a way that the difference between the longest and shortest possible length of the film path does not exceed the distance between two consecutive perforations. Thus, the length of the film 12 which extends between the last-film engaging tooth at the upper side of the feed sprocket 21 and the first film-engaging tooth at the lower side of the sprocket 21 is invariably a whole multiple of a unit distance corresponding to the distance between two consecutive perforations. This insures that the lever 63, which supports the tensioning roll 65 and the movable film guide 66, invariably assumes an exactly predetermined operative position (FIG. 3) and can be readily adjusted for optimum filtering effect, i.e., it can compensate for any inaccuracies in the distance between the teeth of the sprocket 21, for inaccuracies in the machining of other parts of the self-threading device, and other defects. The operation of the self-threading device can be improved still further if the guide roller 55 is not only rotatable but is also movable toward or away from the upper guide face 53. For example, the roller 55 can be installed on a spring-biased bracket, lever or analogous mounting member.

The provision of the holder 61 results in considerable simplification of the self-threading device, and this one-piece holder insures that the distance between the fixed film guides 51 and 59 remains unchanged. Since the member 66 constitutes the sole movable film guide, the self-threading device can be adjusted with little loss in time and with utmost accuracy to insure that each consecutively introduced film is guided in exactly the same path as the preceding film or films. This results in very satisfactory sound reproduction and eliminates the likelihood of damage to the film.

The plate-like carrier 47 supports the entire sound portion 3 and all three film guides of the self-threading device so that each of the parts mounted thereon may be reached and inspected or replaced upon detachment of the carrier 47 from the housing 1. All that the repairman has to do is to remove the screws 48 whereupon the carrier 47 is free to move with reference to the projector housing 1.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In an automatic threading sound projector, a feed sprocket; a sound drum adjacent to but spaced from said sprocket; a first film guide disposed between said sprocket and said drum and having two guide faces; a second film guide surrounding a first portion of said drum and overlying one of said guide faces; a film tensioning member adjacent to the other guide face; a third film guide located between said tensioning member and a non-surrounded second portion of said drum, said third guide being movable between a first position in which it directs the film toward said other guide face and a second position; means for moving said third guide to said first position; and means for moving said third guide to said second position.

2. In an automatic threading sound projector of the type wherein the film is advanced past a film gate; a feed sprocket located downstream of the gate for advancing the film; a sound drum adjacent to but spaced from said sprocket; a first fixed film guide disposed between said sprocket and said drum and having two guide faces one of which guides the film from one side of said sprocket toward the periphery of said drum and the other of which guides the film from the drum to the other side of said sprocket; a second fixed film guide surrounding a first peripheral portion of said drum and having a front end portion overlying said one guide face for guiding the film around said first peripheral portion; a film tensioning roll adjacent to said other guide face; a third film guide located between said tensioning roll and a non-surrounded second peripheral portion of said drum, said third guide being movable between a first position in which it directs the film from the first peripheral portion of the drum toward said other guide face and a second position; actuating means for moving said third guide to said first position; and resilient means for biasing said third guide to said second position.

3. In an automatic threading sound projector of the type wherein the film is advanced past a film gate, a sprocket located downstream of the gate for feeding the film; a sound drum adjacent to but spaced from said sprocket; a first fixed film guide disposed between said sprocket and said drum and having two guide faces one of which guides the film from one side of said sprocket toward the periphery of said drum and the other of which guides the film from the periphery of said drum to the other side of said sprocket; a second fixed film guide surrounding a first peripheral portion of said drum and having a front portion overlying said one guide face for guiding the film around said first peripheral portion; a film tensioning roll adjacent to said other guide face; a third film guide located between said tensioning roll and a non-surrounded second peripheral portion of said drum, said third guide having an edge portion and being movable between a first position in which said edge portion is immediately adjacent to said second peripheral portion and in which said third guide directs the film from said first peripheral portion toward said other guide face and a second position in which said edge portion is more distant from said second peripheral portion; resilient means for biasing said third guide to said second position; and actuating means for moving said third guide to said first position.

4. In an automatic threading sound projector of the type wherein the film is advanced past a film gate, a rotary sprocket located downstream of the gate for feeding the film; a sound drum adjacent to but spaced from said sprocket, said drum being rotatable about a horizontal axis parallel with the axis of said sprocket; a first fixed film guide disposed between said sprocket and said drum and having an upper concave guide face which guides the film from the upper side of said sprocket toward the periphery of said drum and a lower concave guide face which guides the film from the periphery of said drum to the lower side of said sprocket; a second fixed film guide surrounding a first peripheral portion of said drum and having a front portion overlying said upper guide face for guiding the film around said first peripheral portion; a film tensioning roll adjacent to said lower guide face; a third film guide located between said tensioning roll and a non-surrounded second peripheral portion of said drum, said third guide having an edge portion parallel with the axis of said drum and being movable between a first position in which said edge portion is immediately adjacent to said second peripheral portion and in which said third guide directs the film from said first peripheral portion toward said lower guide face and a second position in which said edge portion is more distant from said second peripheral portion; resilient means for biasing said third guide to said second portion; and actuating means for moving said third guide to said first position.

5. In an automatic threading sound projector of the type wherein the film is advanced past a film gate, a sprocket located downstream of the gate for feeding the film; a sound drum adjacent to but spaced from said sprocket; a first fixed film guide disposed between said sprocket and said drum and having two guide faces one of which guides the film from one side of said sprocket toward the periphery of said drum and the other of which guides the film from the periphery of said drum to the other side of said sprocket; a second fixed film guide surrounding a first peripheral portion of said drum and having a front portion overlying said one guide face for guiding the film around said first peripheral portion; a lever rockable about a fixed axis; a film tensioning roll mounted on said lever adjacent to said other guide face; a third film guide mounted on said lever between said tensioning roll and a non-surrounded second peripheral portion of said drum, said third guide having an edge portion and being rockable with said lever between a first position in which said edge portion is immediately adjacent to said second peripheral portion and in which said third guide directs the film from said first peripheral portion toward said other guide face and a second position in which said edge portion is more distant from said second peripheral portion; resilient means for biasing said lever to said second position; and actuating means for moving said lever to said first position.

6. In an automatic threading sound projector of the type wherein the film is advanced past a film gate, a sprocket located downstream of the gate for feeding the film; a sound drum adjacent to but spaced from said sprocket; a fixed holder including a first film guide disposed between said sprocket and said drum and having two guide faces one of which guides the film from one side of said sprocket toward the periphery of said drum and the other of which guides the film from the periphery of said drum to the other side of said sprocket, said holder further including a second film guide surrounding a first peripheral portion of said drum and having a front portion overlying said one guide face for guiding the film around said first peripheral portion; a film tensioning roll supported by said holder adjacent to said other guide face; a third film guide supported by said holder between said tensioning roll and a non-surrounded second peripheral portion of said drum, said third guide having an edge portion and being movable between a first position in which said edge portion is immediately adjacent to said second peripheral portion and in which said third guide directs the film from said first peripheral portion toward said other guide face and a second position in which said edge portion is more distant from said second peripheral portion; resilient means for biasing said third guide to said second position; and actuating means for moving said third guide to said first position.

7. A structure as set forth in claim 6, further comprising at least one guide roller rotatably supported by said holder.

8. A structure as set forth in claim 7, wherein said guide roller is adjacent to said one guide face upstream of said second guide.

9. In an automatic threading sound projector of the type wherein the film is advanced past a film gate, a sprocket rotatable about a fixed axis and located downstream of the gate for feeding the film; a fixed plate-like carrier; a sound portion mounted on said carrier and including a rotary sound drum adjacent to but spaced from said sprocket; a holder fixedly mounted on said carrier and including a first film guide disposed between said sprocket and said drum and having two guide faces one of which guides the film from one side of said sprocket toward the periphery of said drum and the other of which guides the film from the periphery of said drum to the other side of said sprocket, said holder further including a second film guide surrounding a first peripheral portion of said drum and having a front portion overlying said one guide face for guiding the film around said first peripheral portion; a film tensioning roll supported by said holder adjacent to said other guide face; a third film guide supported by said holder between said tensioning roll and a non-surrounded second peripheral portion of said drum, said third guide having an edge portion and being movable between a first position in which said edge portion is immediately adjacent to said second peripheral portion and in which said third guide directs the film from said first peripheral portion toward said other guide face and a second position in which said edge portion is more distant from said second peripheral portion; resilient means for biasing said third guide to said second position; and actuating means for moving said third guide to said first position.

10. A structure as set forth in claim 9, wherein said sound portion comprises a plurality of additional components mounted on said carrier.

11. A structure as set forth in claim 10, further comprising a frame plate rotatably supporting said sprocket and rigid with said holder.

12. In an automatic threading sound projector, a film gate; first and second film looping means respectively located upstream and downstream of said film gate; a feed sprocket located downstream of said second film looping means; a sound drum adjacent to but spaced from said sprocket; a first fixed film guide disposed between said sprocket and said drum and having two guide faces one of which guides the film from one side of said sprocket toward the periphery of said drum and the other of which guides the film from the periphery of said drum toward the other side of said sprocket; a second fixed film guide surrounding a first peripheral portion of said drum and having a front portion overlying said one guide face for guiding the film around said first peripheral portion; a film tensioning member adjacent to said other guide face; a movable support; a third film guide provided on said support and located between said tensioning member and a non-surrounded second peripheral portion of said drum, said third guide being movable with said support and including a film engaging portion; resilient means for biasing said support to a first position in which said film engaging portion is relatively distant from said drum; and manually operated actuating means for moving said support to a second position in which said film engaging portion engages and brakes said drum.

13. In an automatic threading sound projector, a film gate; first and second film looping means respectively located upstream and downstream of said film gate, each said film looping means comprising an element movable to and from a loop forming position; a feed sprocket located downstream of said second film looping means; a sound drum adjacent to but spaced from said sprocket; a first fixed film guide disposed between said sprocket and said drum and having two guide faces one of which guides the film from one side of said sprocket toward the periphery of said drum and the other of which guides the film from the periphery of said drum toward the other side of said sprocket; a second fixed film guide surrounding a first peripheral portion of said drum and having a front portion overlying said one guide face for guiding the film around said first peripheral portion; a film tensioning member adjacent to said other guide face; a movable support; a third film guide provided on said support and located between said tensioning member and a non-surrounded second peripheral portion of said drum, said third guide being movable with said support and including a film engaging portion; resilient means for biasing said support to a first position in which said film engaging portion is relatively distant from said drum; and manually operated actuating means for moving said support to a second position in which said film engaging portion engages and brakes said drum, said actuating means comprising a pushbutton operatively connected with said film looping means for moving said elements to loop forming positions simultaneously with movement of said support to second position.

14. In an automatic threading sound projector of the type wherein the film is advanced past a film gate; a feed sprocket located downstream of the gate for advancing the film, said sprocket having a circumferential groove; a sound drum adjacent to but spaced from said sprocket; a first fixed film guide disposed between said sprocket and said drum and having two guide faces one of which guides the film from one side of said sprocket toward the periphery of said drum and the other of which guides the film from the drum to the other side of said sprocket, said first guide further having a stripping finger extending into said circumferential groove for directing the film onto said one guide face; a second fixed film guide surrounding a first peripheral portion of said drum and having a front end portion overlying said one guide face for guiding the film around said first peripheral portion; a film tensioning roll adjacent to said other guide face; a third film guide located between said tensioning roll and a non-surrounded second peripheral portion of said drum, said third guide being movable between a first position in which it directs the film from the first peripheral portion of the drum toward said other guide face and a second position; actuating means for moving said third guide to said first position; and resilient means for biasing said third guide to said second position.

15. In an automatic threading sound projector of the type wherein the film is advanced past a film gate; a feed sprocket located downstream of the gate for advancing the film; a sound drum adjacent to but spaced from said sprocket; a first fixed film guide disposed between said sprocket and said drum and having two guide faces one of which guides the film from one side of said sprocket toward the periphery of said drum and the other of which guides the film from the drum to the other side of said sprocket, said first guide comprising a stripping member arranged to direct the film from said one side of the sprocket onto said one guide face; a second fixed film guide surrounding a first peripheral portion of said drum and having a front end portion overlying said one guide face for guiding the film around said first peripheral portion; a film tensioning roll adjacent to said other guide face; a third film guide located between said tensioning roll and a non-surrounded second peripheral portion of said drum, said third guide being movable between a first position in which it directs the film from the first peripheral portion of the drum toward said other guide face and a second position; actuating means for moving said third guide to said first position; and resilient means for biasing said third guide to said second position.

16. In an automatic threading sound projector of the type wherein the film is advanced past a film gate; a feed sprocket located downstream of the gate for advancing the film; a sound portion including a sound drum adjacent to but spaced from said sprocket; a first fixed film guide disposed between said sprocket and said drum and having two guide faces one of which guides the film from one side of said sprocket toward the periphery of said drum and the other of which guides the film from the drum to the other side of said sprocket; a second fixed film guide surrounding a first peripheral portion of said drum and having a front end portion overlying said one guide face for guiding the film around said first peripheral portion, said second guide having a plurality of windows and said sound portion comprising a plurality of components each extending into one of said windows; a film tensioning roll adjacent to said other guide face; a third film guide located between said tensioning roll and a non-surrounded second peripheral portion of said drum, said third guide being movable between a first position in which it directs the film from the first peripheral portion of the drum toward said other guide face and a second position; actuating means for moving said third guide to said first position; and resilient means for biasing said third guide to said second position.

17. A structure as set forth in claim 16, wherein said components include a lens assembly, a sound reproducing head and an erasing head.

18. In an automatic threading sound projector, a feed sprocket; a sound drum adjacent to but spaced from said sprocket; a first film guide disposed between said sprocket and said drum and having two guide faces; a second film guide surrounding a first portion of said drum and overlying one of said guide faces, a film tensioning member adjacent to the other guide face and movable to and from a film tensioning position; a third film guide located between said tensioning member and a non-surrounded second portion of said drum, said third guide being movable between a first position in which it directs the film toward said other guide face and a second position; means for moving said third guide to said first position; and resilient means for moving said third guide to said second position and for simultaneously moving said tensioning member to said tensioning position to thereby tension the film around said first portion of the drum.

19. In an automatic threading sound projector of the type wherein the film is advanced past a film gate; a feed sprocket located downstream of the gate for advancing the film; a sound drum adjacent to but spaced from said sprocket; a first fixed film guide disposed between said sprocket and said drum and having two guide faces one of which guides the film from one side of said sprocket toward the periphery of said drum and the other of which guides the film from the drum to the other side of said sprocket; a second fixed film guide surrounding a first peripheral portion of said drum and having a front end portion overlying said one guide face for guiding the film around said first peripheral portion; a spring biased guide roller adjacent to said one guide face and located upstream of said front portion; a film tensioning roll adjacent to said other guide face; a third film guide located between said tensioning roll and a non-surrounded second peripheral portion of said drum, said third guide being movable between a first position in which it directs the film from the first peripheral portion of the drum toward said other guide face and a second position; actuating means for moving said third guide to said first position; and resilient means for biasing said third guide to said second position.

20. In an automatic threading sound projector, a feed sprocket; a fixed carrier; a sound portion including a sound drum mounted on said carrier adjacent to but spaced from said sprocket; a first film guide disposd between said sprocket and said drum and having two guide faces; a second film guide surrounding a first portion of said drum and overlying one of said guide faces; a film tensioning member adjacent to the other guide face; a third film guide located between said tensioning member and a non-surrounded second portion of said drum, said third guide being movable between a first position in which it directs the film toward said other guide face and a second position, said film guides and said tensioning member being mounted on said carrier; means for moving said third guide to said first position; and means for moving said third guide to said second position.

References Cited

UNITED STATES PATENTS

| | | |
|---|---|---|
| 1,871,716 | 8/1932 | May. |
| 2,023,065 | 12/1935 | Conrad et al. _____ 352—29 |
| 3,029,684 | 4/1962 | Wilkins et al. _____ 352—29 |

JULIA E. COINER, *Primary Examiner.*